United States Patent [19]

Yasui et al.

[11] 4,220,871
[45] Sep. 2, 1980

[54] ELECTRIC CONTROL CIRCUIT FOR SAFETY APPARATUS IN AUTOMOTIVE VEHICLES

[75] Inventors: Toshio Yasui, Obu; Motoharu Naito, Okazaki; Ken Asami, Nagoya, all of Japan

[73] Assignees: Nippondenso Co., Ltd., Kariya; Toyota Jidosha Kogyo Kabushiki Kaisha, Toyota, both of Japan

[21] Appl. No.: 940,446

[22] Filed: Sep. 7, 1978

[30] Foreign Application Priority Data

Sep. 8, 1977 [JP] Japan .................... 52-108311

[51] Int. Cl.$^2$ ............................. B60K 28/00
[52] U.S. Cl. ................. 307/10 R; 340/52 H; 180/274
[58] Field of Search ......... 340/52 H, 61; 307/9, 307/10 R; 180/274; 280/735; 361/248, 249, 250, 251; 102/200, 206, 28 P

[56] References Cited

U.S. PATENT DOCUMENTS

| 3,028,809 | 4/1962 | Apstein | 361/248 X |
| 3,622,974 | 11/1971 | Best | 340/52 H X |
| 3,629,816 | 12/1971 | Gillund | 340/61 |
| 3,849,759 | 11/1974 | Hosoka et al. | 340/52 H |

Primary Examiner—L. T. Hix
Assistant Examiner—James L. Dwyer
Attorney, Agent, or Firm—Cushman, Darby & Cushman

[57] ABSTRACT

In an electric control circuit adapted to a safety apparatus including a plurality of actuators in parallel with each other to be electrically operated upon deceleration of vehicle in excess of a predetermined magnitude, a plurality of resistors are connected in series with the respective actuators, each resistance value of the resistors being predetermined in such a manner that even when one of the actuators is shorted at its conductors, a sufficient electric current is supplied to the remaining actuators.

6 Claims, 3 Drawing Figures

ELECTRIC CONTROL CIRCUIT FOR SAFETY APPARATUS IN AUTOMOTIVE VEHICLES

BACKGROUND OF THE INVENTION

The present invention relates to an electric control circuit for actuating a safety apparatus of an automotive vehicle, and more particularly to an electric control circuit adapted to a safety apparatus including a plurality of actuators in parallel with each other to be electrically operated upon deceleration of vehicle in excess of a predetermined magnitude.

In such an electric control circuit as noted above, it is intended that even when one of the actuators may not be energized due to disconnection of a conductor, the safety apparatus is effectively actuated by energization of the remaining actuators to protect the operator safely. However, when one of the actuators is shorted at its conductors, it has been experienced that a sufficient electric current may not be obtained to effectively energize the remaining actuators.

SUMMARY OF THE INVENTION

Accordingly, it is a primary object of the present invention to provide an improved electric control circuit in which a plurality of resistors are connected in series with the respective actuators, each resistance value of the resistors being predetermined in such a manner that even when one of the actuators is shorted at its conductors, a sufficient electric current is supplied to the remaining actuators.

Another object of the present invention is to provide an improved electric control circuit, having the above-mentioned characteristics, in which an electric voltage appearing at each one end of the resistors is detected to inform of malfunction of the control circuit.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
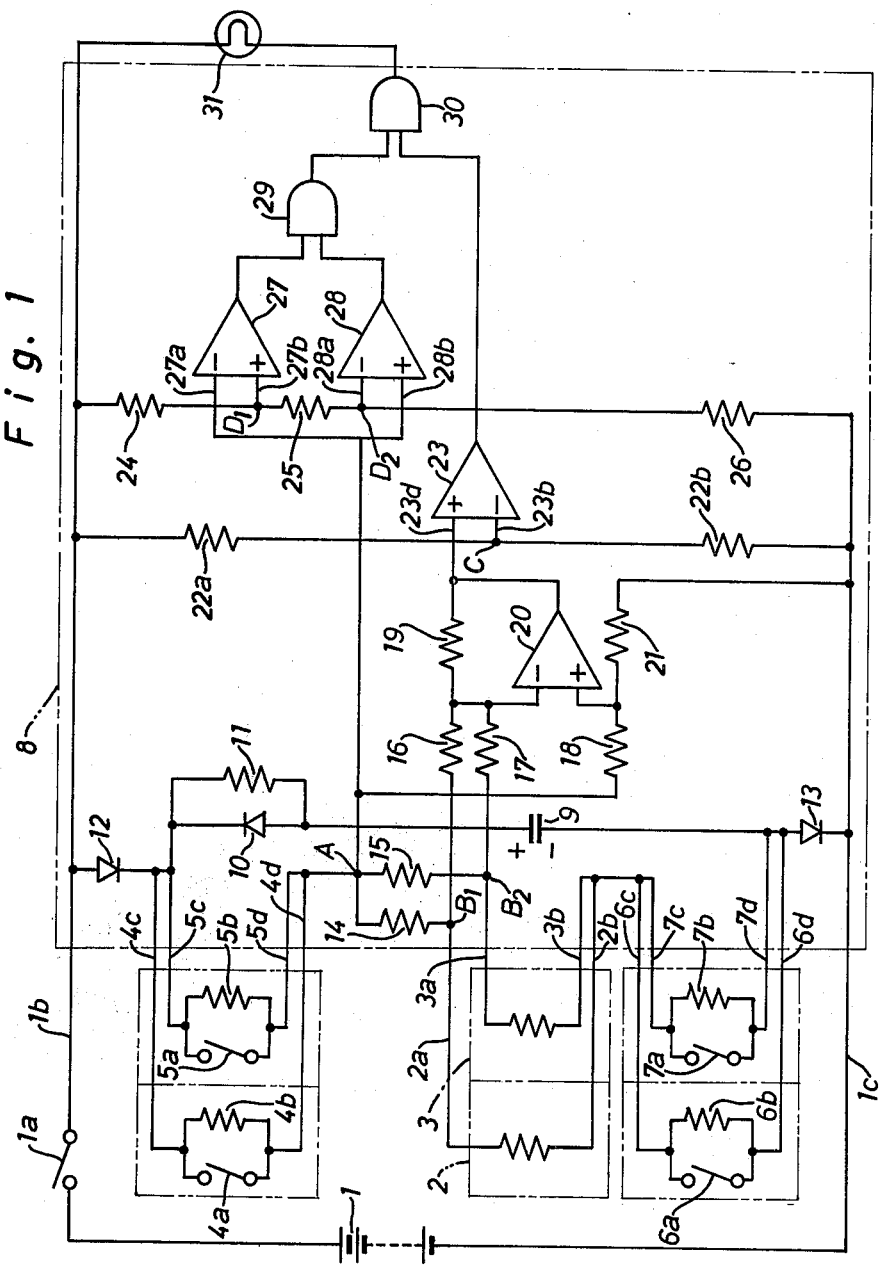
FIG. 1 shows an electric control circuit in accordance with the present invention.

Now referring to FIG. 1 of the accompanying drawings, there is illustrated an electric control circuit in accordance with the present invention which is adapted to a safety apparatus for an automotive vehicle. The safety apparatus includes a pair of conventional primers 2, 3 to be fired electrically to supply fluid under pressure into an inflatable air bag, each of primers 2, 3 having a small internal resistance value. The electric control circuit comprises four collision sensors 4a, 5a, 6a, 7a which are respectively in the form of a normally open switch. The sensors 4a, 6a are provided on a front bumper of the vehicle, and the remaining sensors 5a, 7a are provided on a central portion of the vehicle chassis. Each of the sensors 4a, 5a, 6a, 7a is adapted to be closed in response to an occurrence of vehicle collision to fire the primers 2, 3.

The sensor 4a is in parallel with a resistor 4b and has one end connected to the cathode of a diode 12 through a conductor 4c and the other end connected through a conductor 4d to resistors 14, 15 at a junction A. The sensor 5a is in parallel with a resistor 5b and has one end connected to the cathode of diode 12 through a conductor 5c and the other end connected to the junction A through a conductor 5d. The diode 12 is connected at its anode to a positive electrode of a primary electric power source 1 in the form of a vehicle battery by way of a conductor 1b and an ignition switch 1a. The resistor 14 is connected in series with the primer 2 through a conductor 2a at a junction $B_1$, and the resistor 15 is connected in series with the primer 3 through a conductor 3a at a junction $B_2$. Each resistance value of the resistors 14, 15 is predetermined, as described below in detail, to fire one of the primers 2, 3 even if the other primer is shorted. The sensor 6a is in parallel with a resistor 6b and has one end connected to the primers 2, 3 through conductors 6c, 2b, 3b and the other end connected to the anode of a diode 13 through a conductor 6d. The sensor 7a is in parallel with a resistor 7b and has one end connected to the primers 2, 3 through a conductor 7c and the conductors 2b, 3b and the other end connected to the anode of diode 13 through a conductor 7d. The diode 13 is connected at its cathode with a negative electrode of vehicle battery 1 through a conductor 1c.

When the ignition switch 1a is closed, an electric current from the battery 1 is applied to the resistors 4b, 5b, 14, 15, primers 2, 3 and resistors 6b, 7b across the above-noted conductors and diodes 12, 13 under opening of the sensors 4a, 5a, 6a, 7a. This generates electric voltages $V_A$, $V_{B1}$, $V_{B2}$ at the junctions A, $B_1$, $B_2$ respectively. In this instance it will be understood that the voltages $V_A$, $V_{B1}$, $V_{B2}$ will fluctuate due to short of each of the sensors or disconnection of each of the conductors. Additionally, each resistance value of the resistors 4b, 5b, 6b, 7b is predetermined to be about 1 kΩ such that each electric current through primers 2, 3 is limited to a value below that required to fire each of the primers 2, 3.

The electric control circuit further comprises a storage condenser 9 which is in the form of an aluminum electrolytic condenser. The storage condencer 9 has a positive electrode connected to the cathode of diode 12 through a diode 10 and a resistor 11 and a negative electrode connected to the anode of diode 13. When the ignition switch 1a is closed, the storage condenser 9 is charged with the electric current from battery 1 through diode 12, resistor 11 and diode 13. If one of the conductors 1b, 1c is disconnected in an occurrence of vehicle collision, the storage condenser 9 is discharged through the diode 10 upon closure of each of sensors 4a, 5a, 6a, 7a to fire the primers 2, 3. If the conductor 1b is shorted with one of the conductors 2b, 3b, 6c, 6d, 7c, 7d or the conductor 1c is shorted with the conductors 2a, 3a or one of the conductors 4c, 4d, 5c, 5d, the condenser 9 is discharged through the diode 10 due to function of diodes 12, 13 to fire the primers 2, 3. From the above description, it will be noted that the storage condenser 9 acts as a secondary electric power source for the primers 2, 3.

Figure 2:
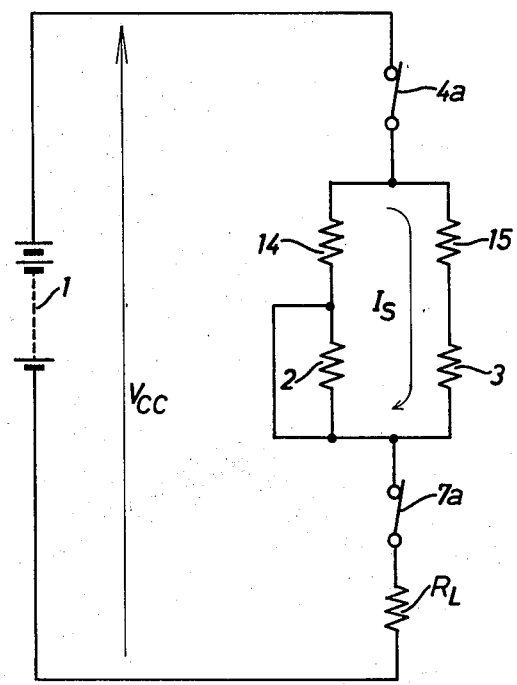
FIG. 2 shows an equivalent circuit of a portion of the control circuit.

In FIG. 2, an equivalent electric circuit is illustrated to fire the primer 3 when the sensors 4a, 7a are closed under short of the primer 2. Assuming that the resistors 14, 15 have the same resistance value and that the primers 2, 3 have the same internal resistance value, an electric current $I_s$ flowing through the primer 3 is obtained as the following equation (1).

$$I_s = \frac{V_{cc}}{\{R_{15}//(R_{15} + R_3)\} + R_L} \times \frac{R_{15}}{2R_{15} + R_3} \quad (1)$$

where $V_{cc}$ indicates an electric voltage of battery 1 and $R_L$ indicates a total resistance value of the above-noted conductors, where $R_{15}$ indicates a resistance value of resistor 15 and $R_3$ indicates an internal resistance value of primer 3, and where $\{R_{15}//(R_3+R_{15})\}$ indicates a total resistance value of an electric circuit including resistor 15 and a series connection formed by a primer 3 and resistor 15 and connected in parallel with resistor 15.

To effectively fire the primer 3 under short of the primer 2, the resistance value $R_{15}$ should be determined to satisfy the following inequality (2).

$$I_0 < I_s \quad (2)$$

where $I_0$ indicates an electric current required to fire the primer 3. For example, assuming that the internal resistance value $R_3$ is $2\Omega$, the resistance value $R_{15}$ to satisfy the inequality (2) may be determined to be $1\Omega$. In other words, this means that the resistor 14 acts as a shunt resistor to provide the electric current $I_s$ required to fire the primer 3. Additionally, the resistance value $R_{15}$ should be preferably determined to give the current $I_s$ a maximum value in the equation (1). If there is a bit of difference between the resistance values $R_2$, $R_3$, the resistance values $R_{14}$, $R_{15}$ may be respectively arranged in accordance with the above difference.

Referring back to FIG. 1, the resistors 14, 15 are connected at junction A to a third input resistor 18 of a differential amplifier 20 whose first and second input resistors 16, 17 are respectively connected to the junction $B_1$ of resistor 14 and the junction $B_2$ of resistor 15. When the electric voltages $V_A$, $V_{B1}$, $V_{B2}$ at junctions A, $B_1$, $B_2$ are respectively applied to the first, second and third input resistors 16, 17, 18, a difference between the voltage $V_A$ and a sum of the voltages $V_{B1}$, $V_{B2}$ is amplified by the amplifier 20 to generate an output or amplified voltage at an output terminal of the amplifier 20. In this embodiment, a resistance value of first input resistor 16 is equal to that of second resistor 17, and a resistance value of third input resistor 18 is equal to a half resistance value of each resistor 16, 17. Further, a resistance value of a resistor 19 is equal to that of a resistor 21.

A comparator 23 has a first input terminal 23a connected to the output terminal of amplifier 20 and a second input terminal 23b connected to a junction c between resistors 22a, 22b. The resistors 22a, 22b are respectively connected to the anode of diode 12 and the cathode of diode 13 to generate a divided constant voltage $V_C$ at junction C. Thus, the resistors 22a, 22b provide a first voltage divider. When the amplified voltage from amplifier 20 is higher than the constant voltage $V_C$ from the first voltage divider, the comparator 23 generates a high level signal therefrom. When the amplified voltage becomes lower than the constant voltage $V_C$, the comparator 23 generates a low level signal therefrom.

The resistors 14, 15 are also connected at junction A to a first input terminal 27a of a comparator 27 and a second input terminal 28b of a comparator 28 respectively. The comparator 27 is connected at its second input terminal 27b to a junction $D_1$ between resistors 24, 25, while the comparator 28 is connected at its first input terminal 28a to a junction $D_2$ between the resistor 25 and a resistor 26. The resistor 24, 25, 26 provide a second voltage divider which is in parallel to the first voltage divider to generate at its junctions $D_1$, $D_2$ high and low divided constant voltages $V_{D1}$, $V_{D2}$. When the electric voltage $V_A$ at the junction A is maintained in a value between the high and low constant voltages $V_{D1}$, $V_{D2}$, the comparators 27, 28 generate high level signals therefrom respectively. When the voltages $V_A$ becomes higher than the high constant voltage $V_{D1}$, the comparators 27, 28 generate low and high level signals therefrom respectively. When the voltage $V_A$ becomes lower than the low constant voltage $V_{D2}$, the comparators 27, 28 generate high and low level signals therefrom respectively.

An AND gate 29 has input terminals respectively connected to the output terminals of comparators 27, 28. AND gate 29 generates a high level signal therefrom when received the high level signals from comparators 27, 28 and also generates a low level signal therefrom in response to one of the low level signals from comparators 27, 28. Another AND gate 30 has input terminals connected respectively to the output terminals of AND gate 29 and comparator 23. AND gate 30 generates a high level signal therefrom in response to the high level signals from AND gate 29 and the comparator 23 and also generates a low level signal therefrom in response to one of the low level signals from AND gate 29 and comparator 23. An indication lamp 31 is provided within a compartment of the vehicle and has one end connected to the positive electrode of battery 1 through the ignition switch 1a and the other end connected to an output terminal of AND gate 30. While the ignition switch 1a is closed, the indication lamp 31 is supplied with electric energy from the battery 1 in response to the low level signal from AND gate 30 to inform the operator of malfunction of the electric control circuit. Furthermore, in an actual practice of the embodiment, the whole component elements enclosed by an imaginary line 8 in FIG. 1 are assembled within a sealed case (not shown) to protect the component elements from damages in an occurrence of vehicle collision.

The mode of operation of the embodiment will now be described in detail. When the ignition switch 1a is closed to start the vehicle, the condenser 9 is charged, the shunt resistors 14, 15 generate an electric voltage $V_A$ at junction A, the resistor 14 generates an electric voltage $V_{B1}$ at junction $B_1$ and the resistor 15 generates an electric voltage $V_{B2}$ at junction $B_2$. And also the first voltage divider generates the constant voltage $V_C$ at junction C, the second voltage divider generates the high and low constant voltages $V_{D1}$, $V_{D2}$ at junctions $D_1$, $D_{D2}$ at junctions $D_1$, $D_2$, and the amplifier 20 amplifies a difference between the voltage $V_A$ and a sum of the voltages $V_{B1}$, $V_{B2}$ to generate an amplified voltage. Then, the comparator 23 receives the amplified voltage and constant voltage $V_C$, the comparator 27 receives the voltage $V_A$ and high constant voltage $V_{D1}$, and the comparator 28 receives the low constant voltage $V_{D2}$ and voltage $V_A$.

In normal operation of the electric control circuit, the voltage $V_A$ is maintained in a value between the high and low constant voltages $V_{D1}$, $V_{D2}$, and the amplified voltage is also maintained higher than the constant voltage $V_C$. Then, the comparator 23 generates a high level signal therefrom, and the comparators 27, 28 generate therefrom high level signals respectively so that AND gate 29 generates a high level signal therefrom. When AND gate 30 receives the high level signals from the comparator 23 and AND gate 29, it generates a high level signal therefrom which is applied to the indication lamp 31. Thus, the indication lamp 31 may not be lit to inform the operator of normality of the electric control circuit prior to or after start of the vehicle. Under such a condition, if one of the sensors 4a, 5a and one of the sensors 6a, 7a are respectively closed in response to an occurrence of vehicle collision, each of the primers 2, 3 is energized by electric energy supplied from the power source 1 by means of a closed circuit including diode 12, resistors 14, 15 and diode 13. If one of the conductors 1b, 1c is disconnected, the storage condenser 9 is discharged through the diode 10 and resistors 14, 15 to energize each of the primers 2, 3.

Even if one of the primers 2, 3 is shorted due to direct connection between the conductors 2a, 2b or the conductors 3a, 3b, the voltages $V_A$, $V_{B1}$, $V_{B2}$ hardly fluctuates due to the small resistance value of the shorted primer. Thus, the voltage $V_A$ is maintained in a value between the high and low constant voltages $V_{D1}$, $V_{D2}$, and the amplified voltages from amplifier 20 is also maintained higher than the constant voltage $V_C$. As a result, AND gate 30 generates a high level signal therefrom, as previously described, so that the indication lamp may not be lit. Under such a condition, when one of the sensors 4a, 5a and one of the sensors 6a, 7a are respectively closed in response to an occurrence of vehicle collision, the other primer is energized by electric energy from the power source 1 due to function of one of the shunt resistors 14, 15.

In case one of the conductors 4c, 5c is disconnected or one of the sensors 6a, 7a is shorted due to direct connection between the conductors 6c, 6d or the conductors 7c, 7d, the voltage $V_A$ becomes lower than the low constant voltage $V_{D2}$ at junction $D_2$, and the amplified voltage from amplifier 20 becomes lower than the constant voltage $V_C$. Then, the comparator 23 generates a low level signal, and the comparators 27, 28 generate high and low level signals respectively so that AND gate 29 generates a low level signal therefrom. Upon receiving the low level signals from the comparator 23 and AND gate 29, AND gate 30 generates a low level signal therefrom which is applied to the indication lamp 31. Thus, the indication lamp 31 is lit to inform the operator of malfunction of the electric control circuit prior to or after start of the vehicle.

In case one of the conductors 6c, 7c is disconnected or one of the sensors 4a, 5a is shorted due to direct connection between the conductors 4c, 4d or the conductors 5c, 5d, the voltage $V_A$ becomes higher than the high constant voltage $V_{D2}$ at junction $D_2$, and the amplified voltage becomes higher than the constant voltage $V_C$. Then, the comparator 23 generates a high level signal, and the comparators 27, 28 generate low and high level signals respectively so that AND gate 29 generates a low level signal therefrom. Upon receiving the high and low level signals from the comparator 23 and AND gate 29, AND gate 30 generates a low level signal therefrom. Thus, the indication lamp 31 is lit to inform the operator of malfunction of the electric control circuit.

In case one of the conductors 4c, 5c and one of the conductors 6c, 7c are simultaneously disconnected, the voltage $V_A$ is maintained in a value between the high and low constant voltages $V_{D1}$, $V_{D2}$, and the amplified voltage becomes lower than the constant voltage $V_C$. Then, the comparator 23 generates a low level signal, and the comparators 27, 28 generate high level signals respectively so that AND gate 29 generates a high level signal therefrom. Upon receiving the low and high level signals from the comparator 23 and AND gate 29, AND gate 30 generates a low level signal therefrom. Thus, the indication lamp 31 is lit to inform the operator of malfunction of the electric control circuit.

Figure 3:
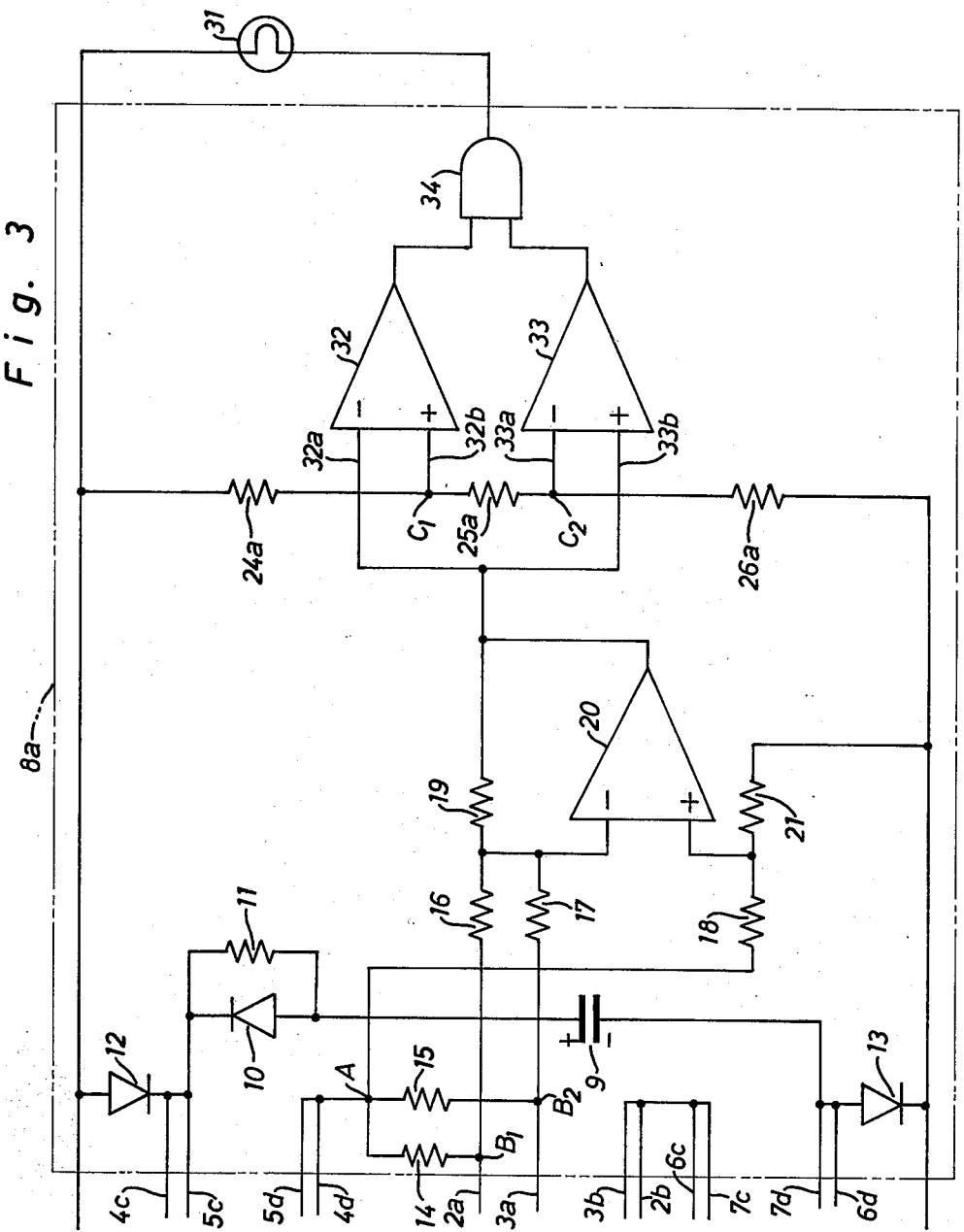
FIG. 3 shows a modification of the present invention.

FIG. 3 illustrates a modification of the present invention in which the above-noted differential amplifier 20 is connected at its output terminal to a first input terminal 32a of a comparator 32 and a second input terminal 33b of a comparator 33. The comparator 32 is connected at its second input terminal 32b to a junction $C_1$ between resistors 24a, 25a, while the comparator 33 is connected at its first input terminal 33a to a junction $C_2$ between the resistor 25a and a resistor 26a. The resistors 24a, 25a, 26a provide a voltage divider which is in series with the above-noted battery 1 through the ignition switch 1a to generate at its junctions $C_1$, $C_2$ high and low divided constant voltage $V_{C1}$, $V_{C2}$. When the amplified voltage from amplifier 20 is maintained in a value between the high and low constant voltages $V_{C1}$, $V_{C2}$, the comparators 32, 33 generate high level signals therefrom respectively. When the amplified voltage becomes higher than the high constant voltage $V_{D1}$, the comparators 32, 33 generate low and high level signals therefrom respectively. When the amplified voltage becomes lower than the low constant voltage $V_{D2}$, the comparators 32, 33 generate high and low level signals therefrom respectively.

An AND gate 34 has input terminals connected to the output terminals of comparators 32, 33 respectively. AND gate 34 generates a high level signal in response to the high level signals from comparators 32, 33 and also generates a low level signal in response to one of the low level signals from comparators 32, 33. The high or low level signal from AND gate 34 is applied to the indication lamp 31.

In operation, when the ignition switch 1a is closed to start the vehicle, the condenser 9 is charged, the shunt resistors 14, 15 generate an electric voltage $V_A$ at junction A, the resistor 14 generates an electric voltage $V_{B1}$ at junction $B_1$ and the resistor 15 generates an electric voltage $V_{B2}$ at junction $B_2$. And also the voltage divider generates the high and low constant voltages $V_{C1}$, $V_{C2}$ at junctions $C_1$, $C_2$, and the amplifier 20 amplifies a difference between the voltage $V_A$ and a sum of the voltages $V_{B1}$, $V_{B2}$ to generate an amplified voltage. Then, the comparator 32 receives the amplified voltage and high constant voltage $V_{C1}$, and the comparator 33 receives the low constant voltage $V_{C2}$ and the amplified voltage.

In normal operation of the electric control circuit, the amplified voltage from amplifier 20 is maintained in a value between the high and low constant voltages $V_{C1}$, $V_{C2}$. Then, the comparators 32, 33 generate high level signals respectively so that AND gate 34 generates a high level signal therefrom. Thus, the indication lamp 31 may not be lit to inform the operator of normality of the electric control circuit prior to or after start of the vehicle. In this case, even if one of the primers 2, 3 is shorted due to direct connection between the conductors 2a, 2b or the conductors 3a, 3b, the voltages $V_{A1}$, $V_{B1}$, $V_{B2}$, are hardly changed due to the small resistance value of the shorted primer. Thus, the amplified voltage is maintained in a value between the high and low constant voltages $V_{C1}$, $V_{C2}$. As a result, AND gate 34 generates a high level signal, as previously described, so that the indication lamp may not be lit.

In case one of the conductors 4c, 5c is disconnected or one of the sensors 6a, 7a is shorted due to direct connection between the conductors 6c, 6d or the conductors 7c, 7d, the amplified voltage becomes lower than the low constant voltage $V_{C2}$. Then, the comparators 32, 33 generate high and low level signals respectively so that AND gate 34 generates a low level signal therefrom. Thus, the indication lamp 31 is lit to inform the operator of malfunction of the electric control circuit. In this case, if one of the conductors 4c, 5c and one of the conductors 6c, 7c are simultaneously disconnected, the amplified voltage becomes lower than the constant voltage $V_{C2}$. Thus, AND gate 34 generates a low level signal, as previously described, so that the indication lamp 31 is lit to inform the operator of malfunction of the electric control circuit.

In case one of the conductors 6c, 7c is disconnected or one of the sensors 4a, 5a is shorted due to direct connection between the conductors 4c, 4d or the conductors 5c, 5d, the amplified voltage becomes higher than the constant voltage $V_{C1}$. Then, the comparators 32, 33 generate low and high level signals so that AND gate 34 generate a low level signal therefrom. Thus, the indication lamp 31 is lit to inform the operator of malfunction of the electric control circuit.

For a practical use of the present invention, it is noted that the present invention may be adapted to various kinds of safety apparatuses for automotive vehicles.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an electric control circuit for a safety apparatus of an automotive vehicle, which control circuit comprises an electric power source, normally open switch means to be closed in an occurrence of vehicle collision, and first and second electrically operated actuator means connected respectively in seies with said power source through said switch means to actuate said safety apparatus upon closure of said switch means, the improvement comprising:
first and second resistors connected respectively in series with said first and second actuator means, each resistance value of said first and second resistors being predetermined with respect to internal resistances of the respective actuator means in such a manner that even when one of said actuator means is shorted, a sufficient electric current is supplied to the other actuator means from said power source to actuate said other actuator means.

2. An electric control circuit for a safety apparatus as claimed in claim 1, wherein said switch means includes a pair of normally open switches connected at each one end thereof to said power source and at each other end thereof in series with said first and second actuator means.

3. An electric control circuit for a safety apparatus as claimed in claim 1, further comprising:

a storage condenser connected in parallel with said switch means, resistors and actuator means;

a first electric element interposed between the positive electrodes of said power source and condenser for permitting an electric current from said power source to said condenser and said actuator means and interrupting an electric current discharged from said condenser therethrough; and a second electric element interposed between the negative electrodes of said power source and condenser for permitting an electric current flowing through said actuator means to the negative electrode of said power source and interrupting a reverse electric current flowing therethrough.

4. In an electric control circuit for a safety apparatus of an automotive vehicle, which control circuit comprises an electric power source, normally open switch means to be closed in an occurrence of vehicle collision, and first and second electrically operated actuator means connected respectively in series with said power source through said switch means to actuate said safety apparatus upon closure of said switch means, the improvement comprising:
first and second resistors connected respectively in series with said first and second actuator means, each resistance value of said first and second resistors being predetermined in such a manner that even when one of said actuator means is shorted, a sufficient electric current is supplied to the other actuator means from said power source;

a resistor connected in parallel with said switch means;

detecting means for detecting changes of an electric voltage appearing at each one end of said first and second resistors to generate an output signal therefrom when the electric voltage of said first and second resistors becomes lower than a predetermined constant voltage; and means for informing of malfunction of said control circuit in response to the output signal from said detecting means.

5. In an electric control circuit for a safety apparatus of an automotive vehicle, which control circuit comprises an electric power source, normally open switch means to be closed in an occurrence of vehicle collision, and first and second electrically operated actuator means connected respectively in series with said power source through said switch means to actuate said safety apparatus upon closure of said switch means.

the improvement comprising:
first and second resistors connected respectively in series with said first and second actuator means, each resistance value of said first and second resistors being predetermined in such a manner that even when one of said actuator means is shorted, a sufficient electric current is supplied to the other actuator means from said power source;

a resistor connected in parallel with said switch means;

a constant voltage generator connected in series with said power source for generating low and high constant voltages therefrom;

a first comparator for comparing an electric voltage appearing at each one end of said first and second resistors with the low constant voltage to generate an output signal therefrom when the electric voltage of said first and second resistors becomes lower than the low constant voltage;

a second comparator for comparing the electric voltage of said first and second resistors with the high constant voltage to generate an output signal therefrom when the electric voltage of said first and second resistors becomes higher than the high constant voltage; and means for informing of malfunction of said control circuit in response to one of the output signals from said first and second comparators.

6. An electric control circuit for a safety apparatus as claimed in claim 5, further comprising:

an amplifier for amplifying the electric voltage of said first and second resistors to generate an amplified voltage;

a second constant voltage generator connected in series with said power source to generate a constant voltage therefrom; and a third comparator for comparing the amplified voltage from said amplifier with the constant voltage to generate an output signal therefrom when the amplified voltage becomes lower than the constant voltage;

and wherein said informing means informs of malfunction of said control circuit in response to one of the output signals from said first, second and third comparators.

* * * * *